(12) United States Patent
Seljestad

(10) Patent No.: US 11,891,152 B2
(45) Date of Patent: Feb. 6, 2024

(54) HUMAN-POWERED VEHICLE

(71) Applicant: Gregory Allan Seljestad, Nibley, UT (US)

(72) Inventor: Gregory Allan Seljestad, Nibley, UT (US)

(*) Notice: Subject to any disclaimer, the term of this patent is extended or adjusted under 35 U.S.C. 154(b) by 311 days.

(21) Appl. No.: 17/343,646

(22) Filed: Jun. 9, 2021

(65) Prior Publication Data

US 2021/0403122 A1  Dec. 30, 2021

Related U.S. Application Data

(60) Provisional application No. 63/036,940, filed on Jun. 9, 2020.

(51) Int. Cl.
*B62M 1/16* (2006.01)
*B62K 5/05* (2013.01)
*B62K 5/08* (2006.01)

(52) U.S. Cl.
CPC .............. *B62M 1/16* (2013.01); *B62K 5/05* (2013.01); *B62K 5/08* (2013.01)

(58) Field of Classification Search
CPC ............... B62M 1/16; B62K 5/05; B62K 5/08
See application file for complete search history.

(56) References Cited

U.S. PATENT DOCUMENTS

| | | | | |
|---|---|---|---|---|
| 10,479,439 B2* | 11/2019 | Jones | ........................ | B62M 9/16 |
| 11,492,071 B2* | 11/2022 | Ziskind | .................... | B62K 5/06 |
| 2006/0038374 A1* | 2/2006 | Montez | ................... | B62K 5/023 |
| | | | | 280/244 |
| 2009/0095115 A1* | 4/2009 | Lee | ......................... | B62K 3/005 |
| | | | | 74/496 |
| 2011/0309596 A1* | 12/2011 | Holmes | .................... | B62M 1/16 |
| | | | | 74/25 |

\* cited by examiner

*Primary Examiner* — Kevin Hurley
*Assistant Examiner* — Hosam Shabara
(74) *Attorney, Agent, or Firm* — Svendsen Legal, LLC

(57) ABSTRACT

A vehicle is powered and steered by a rider's arm. The vehicle may be a cycle or a tricycle Propulsion occurs in response to the rider pushing and pulling on the handlebar along a fore-and-aft direction. The propulsion mechanism resists or prevents the cycle from unintentionally rolling in reverse. Steering occurs in response to the rider pushing the handlebar to the right or left. The steering mechanism responds the same no matter where the propulsion system is in its range of motion and can provide approximately a 5-foot turning radius for a rider steering input, by moving the handlebar approximately 1 foot right or left of center steer, while maintaining front wheel alignment. A shifting mechanism provides multiple settings between lower gears for hills and higher gears for speed.

17 Claims, 12 Drawing Sheets

HUMAN-POWERED VEHICLE

TECHNICAL FIELD

The present disclosure relates to human-powered vehicles or cycles. More specifically, the present disclosure relates to a recumbent tricycle powered by the rider's upper body.

BACKGROUND

Development of the disclosed technology was motivated by perceived needs in human and hand-powered or upper body powered vehicles or "cycles". There is a need to increase efficiency in transmitting power from the rider to a driving wheel of the cycle; a need for smaller turning radius or turning circle; and a need for less costly cycles.

BRIEF DESCRIPTION OF DRAWINGS

Exemplary embodiments of the technology will become more fully apparent from the following description and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

Figure 1:
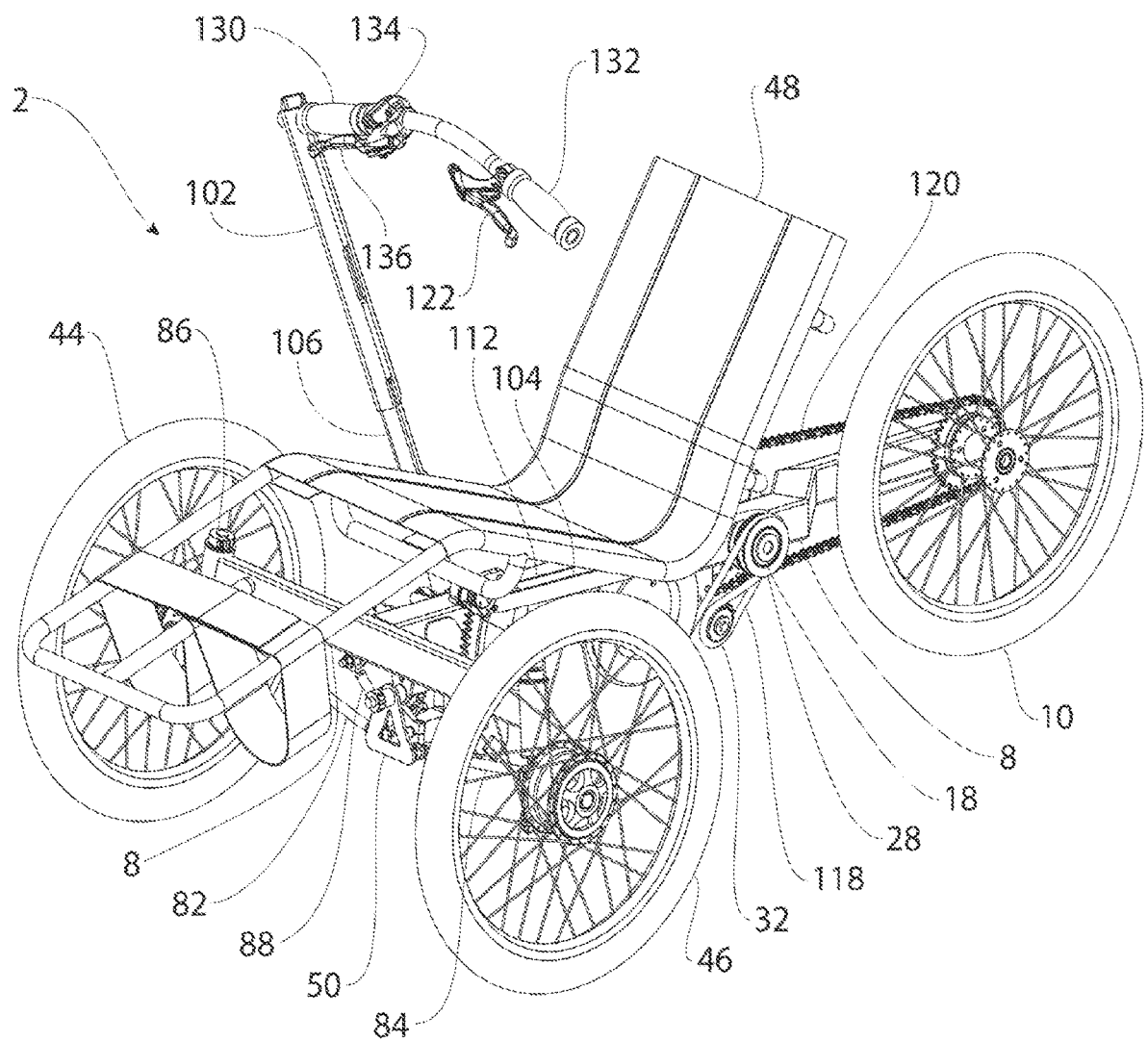
FIG. 1 is an oblique view of a human-powered vehicle as a tricycle, according to an embodiment of the invention.

Reference characters included in the above drawings indicate corresponding parts throughout the several views, as discussed herein. The description herein illustrates one or more preferred and alternative embodiments of the invention, and the description herein is not to be construed as limiting the scope of the invention in any manner. It should be understood that the above listed figures are not necessarily to scale and that the embodiments may be illustrated by fragmentary views, graphic symbols, diagrammatic or schematic representations, extended angles, and center lines. Details that are not necessary for an understanding of the present invention by one skilled in the technology of the invention, or render other details difficult to perceive, may have been omitted.

DETAILED DESCRIPTION OF SPECIFIC EMBODIMENTS

Figure 2:
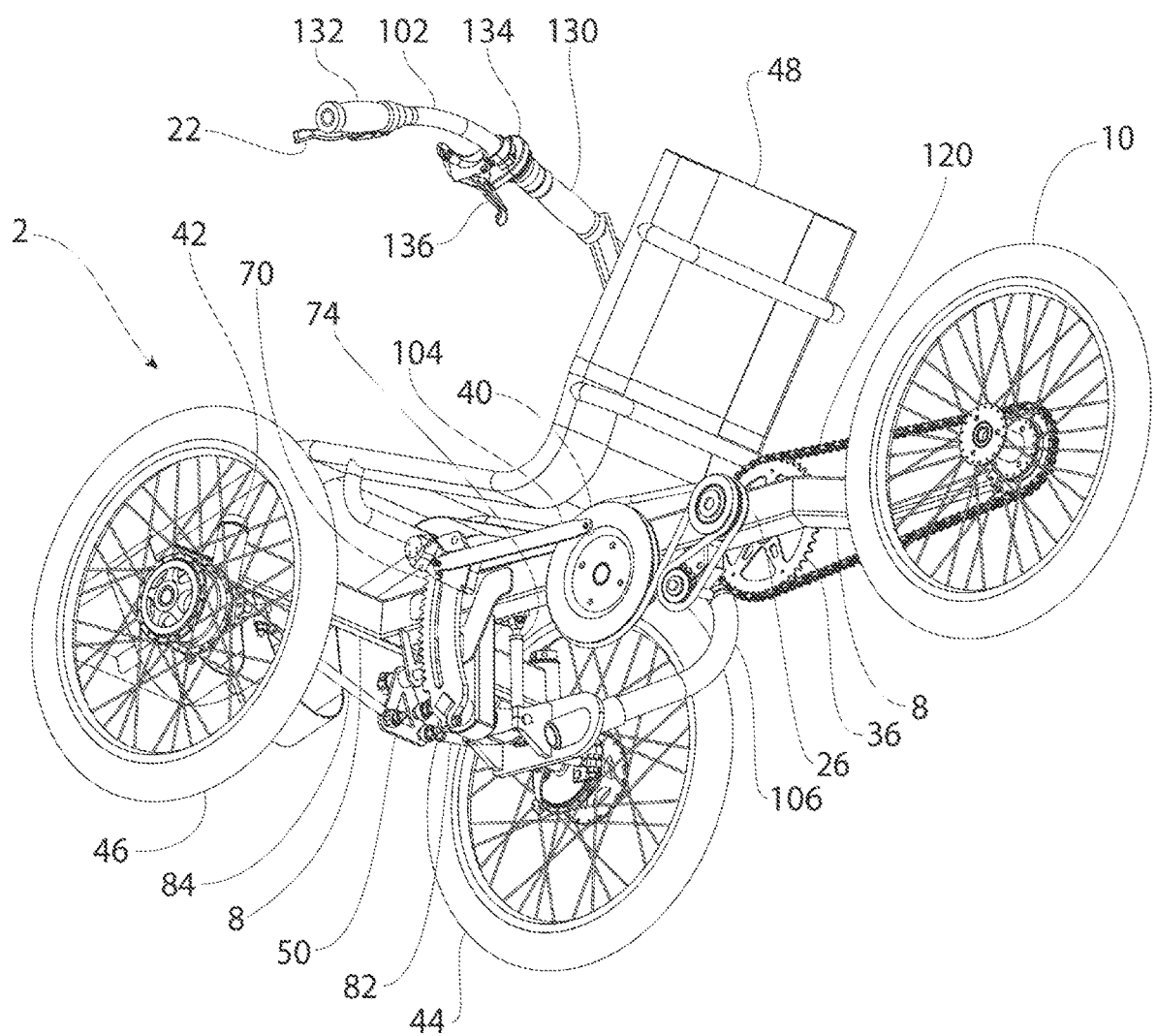
FIG. 2 is another oblique view of the tricycle of FIG. 1 from a different direction, according to an embodiment of the invention.
Figure 3A:
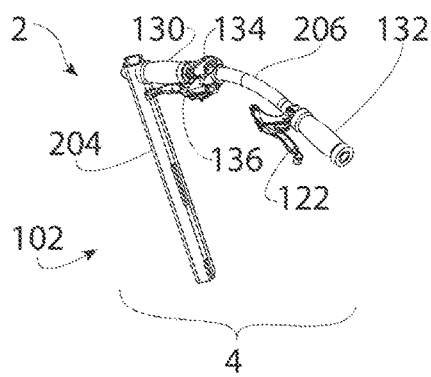
FIG. 3A is an oblique view of a portion of the tricycle of FIG. 1, showing a handle group of parts, according to an embodiment of the invention.
Figure 3B:
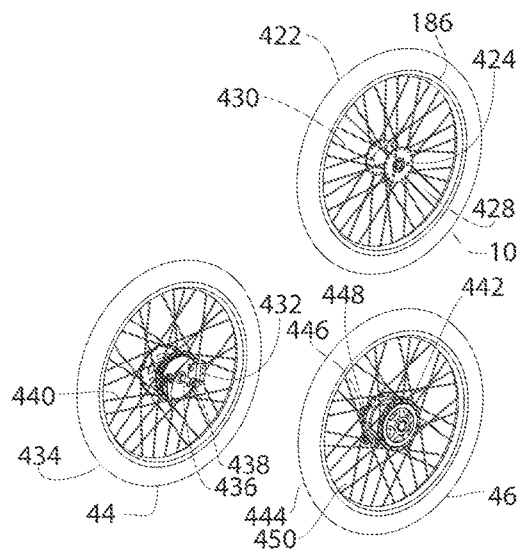
FIG. 3B is an oblique view of a portion of the tricycle of FIG. 1, showing a rear wheel assembly, a right wheel assembly, and a left wheel assembly, according to an embodiment of the invention.
Figure 3C:
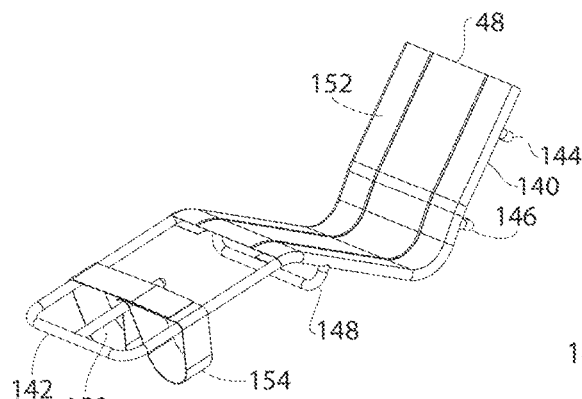
FIG. 3C is an oblique view of a portion of the tricycle of FIG. 1, showing a seat assembly, according to an embodiment of the invention.
Figure 3D:
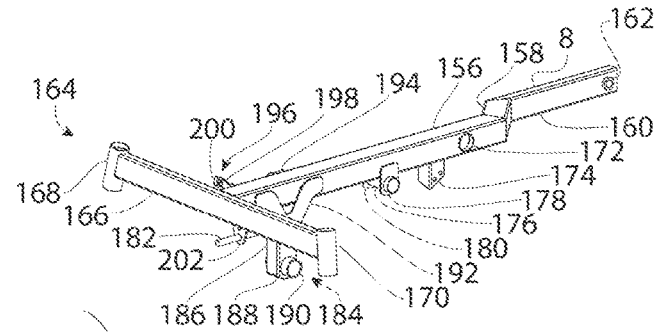
FIG. 3D is an oblique view of a portion of the tricycle of FIG. 1, showing a frame assembly, according to an embodiment of the invention.
Figure 3E:
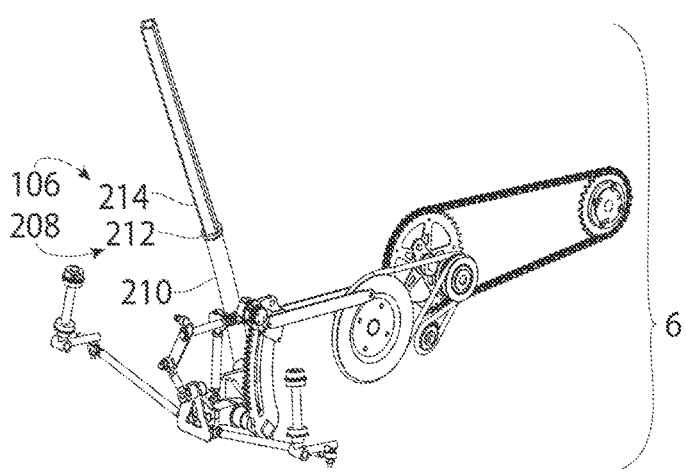
FIG. 3E is an oblique view of a portion of the tricycle of FIG. 1, showing a transmission and steering group of parts, according to an embodiment of the invention.
Figure 4A:
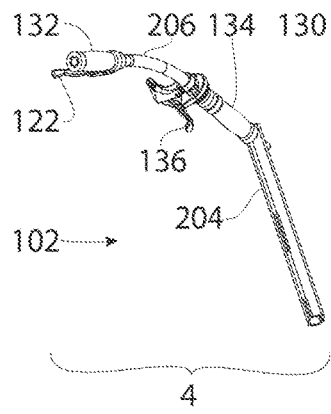
FIG. 4A is another exploded oblique view of the tricycle of FIG. 1 in a different direction from FIG. 3A, also showing the handle parts group, according to an embodiment of the invention.
Figure 4B:
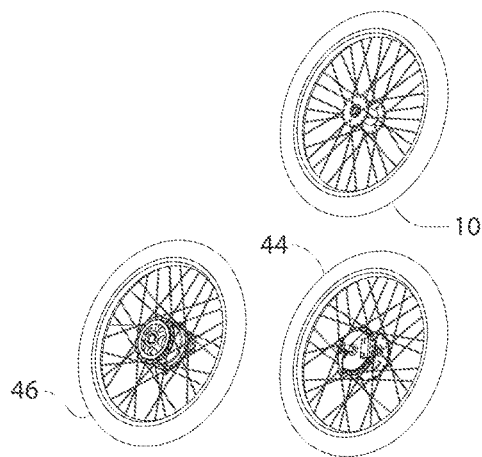
FIG. 4B is an oblique view of a portion of the tricycle of FIG. 1 in a different direction from FIG. 3B, also showing the rear wheel assembly, the right wheel assembly, and the left wheel assembly, according to an embodiment of the invention.
Figure 4C:
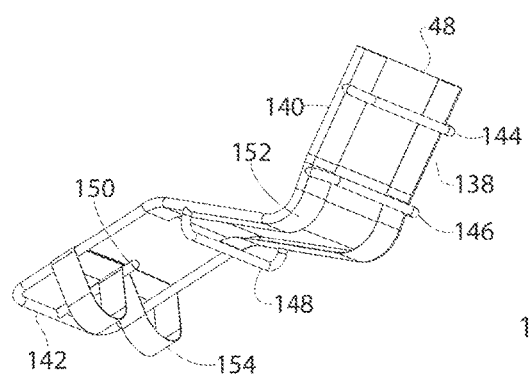
FIG. 4C is an oblique view of a portion of the tricycle of FIG. 1 in a different direction from FIG. 3C, also showing the seat assembly, according to an embodiment of the invention.
Figure 4D:
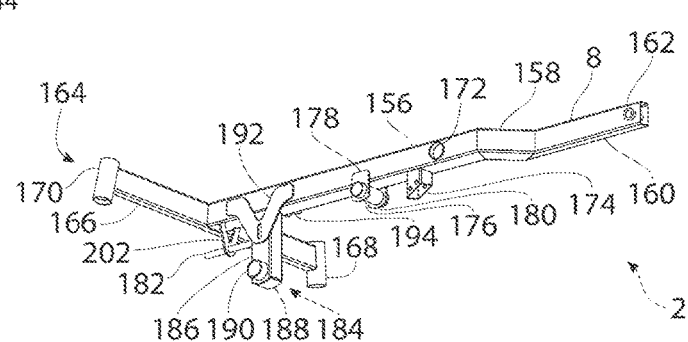
FIG. 4D is an oblique view of a portion of the tricycle of FIG. 1 in a different direction from FIG. 3D, also showing the frame assembly, according to an embodiment of the invention.
Figure 4E:
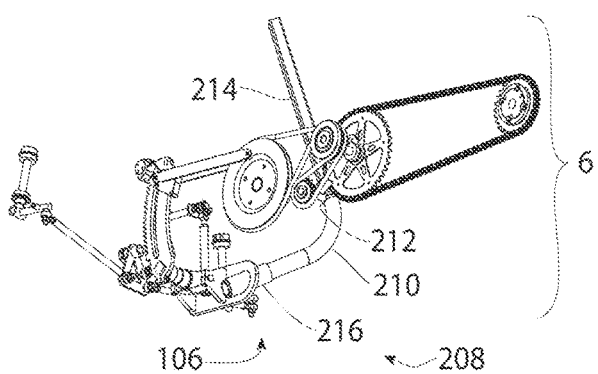
FIG. 4E is an oblique view of a portion of the tricycle of FIG. 1 in a different direction from FIG. 3E, also showing the transmission and steering group, according to an embodiment of the invention.

Referring to FIGS. 1 through 2, the human-powered vehicle of the present invention as embodied in a tricycle 2 in a most preferred embodiment, is adapted for a recumbent rider position. The tricycle 2 or more generally referred to as a cycle, is powered and steered by the rider's arms (upper arm, forearm, and/or hand), with or without contributions from the rider's upper body. Since the tricycle 2 needs no input from the rider's legs, the legs may be absent due to amputation or birth defect, underdeveloped, paralyzed, weak, uncontrolled, or be normal. Propulsion occurs in response to the rider pushing and pulling on the handlebar along a fore-and-aft direction. The propulsion system, or propulsion mechanism, resists or prevents the tricycle 2 from unintentionally rolling in reverse. Steering occurs in response to the rider pushing the handlebar to the right or left. The steering system, or steering mechanism, operates the same no matter where the propulsion system is in its range of motion. The illustrated steering system provides a 10-foot turning circle (5-foot turning radius) for a rider steering input that moves the handlebar 1 foot right or 1 foot left of center (neutral), while maintaining satisfactory front wheel alignment to prevent tire scrubbing. A shifting system, or shifting mechanism, provides multiple settings between a low gear for hills and a high gear for speed.

The tricycle 2 may include a frame assembly 8, a rear wheel assembly 10, a bearing 12, a bearing 14 identical to bearing 12, a sprocket crank assembly 16, a drive shaft assembly 18, a washer 20, a washer 22 identical to washer 20, a lock nut 24, a clutch assembly 26, a clutch assembly 28 identical to clutch assembly 26, an 8 mm key 30, an idle sprocket 32, a bearing spacer 34, a front sprocket 36, a drive mount assembly 38, a drive pulley 40, a left spindle group 42, a right wheel assembly 44, a left wheel assembly 46, a seat assembly 48, a steering group 50, a bearing 62, a bearing 64 identical to bearing 62, a bearing 66, a bearing 68 identical to bearing 66, a lever arm group 70, a crank group 72, a rod group 74, an 8 mm ball 76, a tie rod group 82, a tie rod group 84 identical to tie rod group 82, a right spindle group 86, a tie rod group 88, a stop assembly 90, a washer 92, a washer 94 identical to washer 92, a bolt 96, a lock nut 98, a ball 100 for 10 mm rod eye, a handle assembly 102, a link 104, a link 112 identical to link 104, a base assembly 106, a shift group 108, a plastic bearing 110, a plastic bearing 114 identical to plastic bearing 110, a pin 116, a round belt 118, a rear chain assembly 120, a brake lever sport assembly 122, a brake lever sport assembly 136 identical to brake lever sport assembly 122, a rear sprocket adapter 124, a rear sprocket 126, a drive stub 128, a foam hand grip 130, a foam hand grip 132 identical to hand grip 130, and/or a twist grip group 134.

Specifically, in the alternative, the round belt 118 and the rear chain assembly 120 referred to herein may be endless belts, chain loops or endless chains, as well known to those skilled in cycle drive and transmission design.

Referring to FIGS. 3A through 3E and 4A through 4E, the tricycle 2 is shown exploded into seven sub-assemblies or parts groups: a handle group 4, a transmission and steering group 6, the frame assembly 8, the rear wheel assembly 10, the right wheel assembly 44, the left wheel assembly 46, and the seat assembly 48.

The handle group 4 may include the handle assembly 102, the brake lever sport assembly 122, the brake lever sport assembly 136, the foam hand grip 130, the foam hand grip 132, and/or the twist grip group 134 (or shift control group). The handle assembly 102 may include a top tube 204 and/or a handlebar 206. The brake lever sport assemblies 122, 136, the foam hand grips 130, 132, and/or the twist grip group 134 may be commercially available off-the-shelf parts or sub-assemblies.

When the handle group 4 is operatively assembled as shown in FIGS. 3A through 3E and 4A through 4E, the top tube 204 and handlebar 206 may be rigidly fixed together; the brake lever sport assemblies 122, 136 and twist grip group 134 may be securely mounted to the handlebar 206; and the foam hand grips 130, 132 may receive the handlebar 206.

The frame assembly 8 may include a tube 156, a tube 158, a tube 160, a boss 162, a crossmember assembly 164, a boss 172, a tube idler mount 174, a boss 176, a plate 178, a plate 180 identical to plate 178, a shaft 182, a down tube assembly 184, a plate 192, a plate 194, a plate assembly 196, and/or a plate 202.

The crossmember assembly 164 may include a front tube 166, a boss kingpin 168, and/or a boss kingpin 170 identical to boss kingpin 168.

The down tube assembly 184 may include a down tube 186, a plate 188, and/or a tube 190.

The plate assembly 196 may include a plate 198 and/or a threaded boss 200.

When operatively assembled as shown in FIGS. 3A through 3E and 4A through 4E, all component parts of the frame assembly 8 may be rigidly fixed together, for example, by welding.

The seat assembly 48 may include a 15-inch seat tube 138, a 15-inch seat tube 140 identical to seat tube 138, a 15-inch foot bar 142, a 15 inch seat crossmember 144, a 15 inch seat crossmember 146 identical to seat crossmember 144, a 15-inch seat crossmember 148 identical to seat crossmember 144, a 15-inch seat divider 150, a 15-inch seat cover 152, and/or leg straps 154. Note that 15 inches is a preferred standard seat width for a recumbent vehicle, such as a bicycle, tricycle, or quadricycle, but other widths are considered as alternatives.

When operatively assembled as shown in FIGS. 3A through 3E and 4A through 4E, the 15-inch seat tubes 138, 140, 15-inch foot bar 142, 15-inch seat crossmembers 144, 146, 148, and 15-inch seat divider 150 may be rigidly fixed together, for example, by welding. The 15-inch seat cover 152 and leg straps 154 may be fabric, mesh, leather, or other flexible sheet material.

The rear wheel assembly 10 may include a rim and tire 422, a hub 424, a rear bearing 426, a rear bearing 428 identical to rear bearing 426, and/or rear spokes 430.

The right wheel assembly 44 may include a center hub 432, a rim and tire 434 identical to rim and tire 422, an axle 436, a lock nut 438, and/or spokes 440.

The left wheel assembly 46 may include a center hub 442, a rim and tire 444 identical to rim and tire 422, an axle 446 identical to axle 436, a lock nut 448 identical to lock nut 438, and spokes 450 identical to spokes 440.

Referring to FIGS. 3E and 4E and 5A through 5D, the transmission and steering group 6 may include the bearing 12, the bearing 14, the sprocket crank assembly 16, the drive shaft assembly 18, the washer 20, the washer 22, the lock nut 24, the clutch assembly 26, the clutch assembly 28, the 8 mm key 30, the idle sprocket 32, the bearing spacer 34, the front sprocket 36, the drive mount assembly 38, the drive pulley 40, the left spindle group 42, the steering group 50, the bearing 62, the bearing 64, the bearing 66, the bearing 68, the lever arm group 70, the crank group 72, the rod group 74, the tie rod group 82, the tie rod group 84, the right spindle group 86, the left spindle group 42, the tie rod group 88, the stop assembly 90, the washer 92, the washer 94, the bolt 96, the lock nut 98, the ball 100 for 10 mm rod eye, the link 104, the link 112, the base assembly 106, the shift group 108, the plastic bearing 110, the plastic bearing 114, the pin 116, the round belt 118, the rear chain assembly 120, the rear sprocket adapter 124, the rear sprocket 126, and/or the drive stub 128.

Specifically, a preferred clutch for use in the clutch assembly 26 and the clutch assembly 28 is a CSK25PP model 25 mm "sprag clutch" type of one-way bearing, as sold by Acer Racing of Los Angeles CA Other clutch types could be employed in the alternative, but considered less effective for use with the clutch assembies.

The bearings 12, 14 are received in the boss 172 of the frame assembly 8.

The sprocket crank assembly 16 may include a keyed hub 228, a plate 230, and/or a pin 232. The sprocket crank assembly 16 is associated with the 56 boss 172 of the frame assembly 8.

The drive shaft assembly 18 may include a keyed shaft 234, a keyed shaft 236, and/or a washer 238. The drive shaft assembly 18 extends through the boss 172 of the frame assembly 8.

The clutch assembly 26 may include a pulley 240 for round belt and/or a clutch 242. The clutch assembly 26 only transmits torque when the pulley 240 for round belt rotates in a first direction. No torque is transmitted when the pulley 240 for round belt rotates in a second direction opposite the first direction.

Figure 5A:
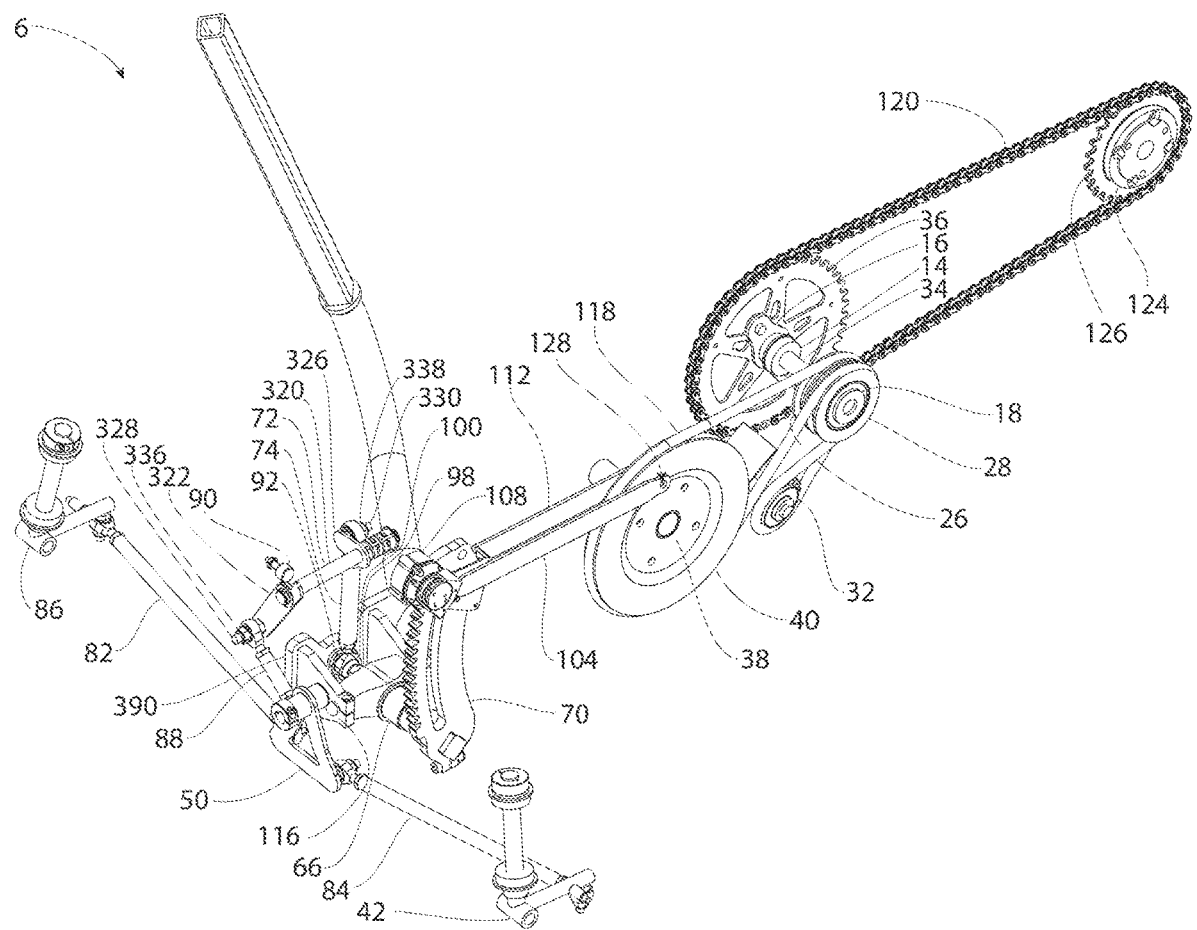
FIG. 5A is an oblique view of the transmission and steering group of FIG. 3E, according to an embodiment of the invention.
Figure 5B:
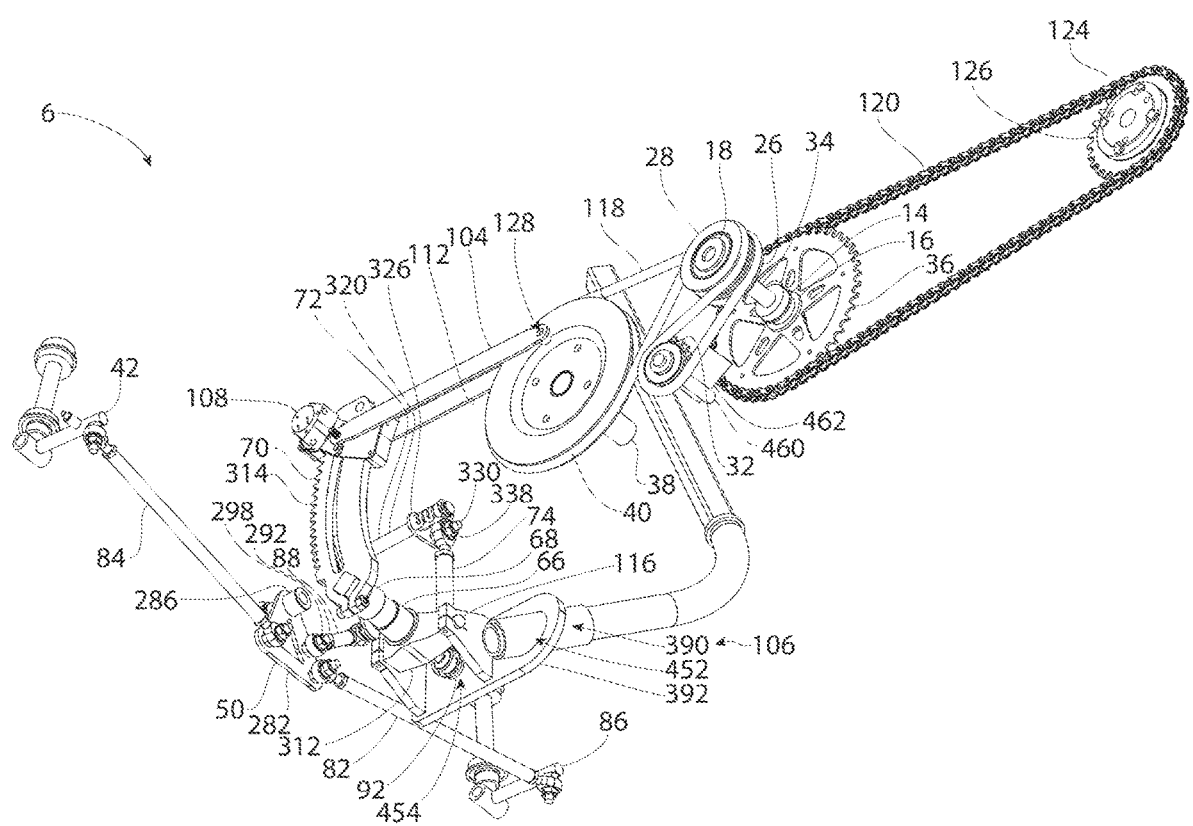
FIG. 5B is another oblique view of the transmission and steering group of FIG. 3E in a different direction, according to an embodiment of the invention.
Figure 5C:
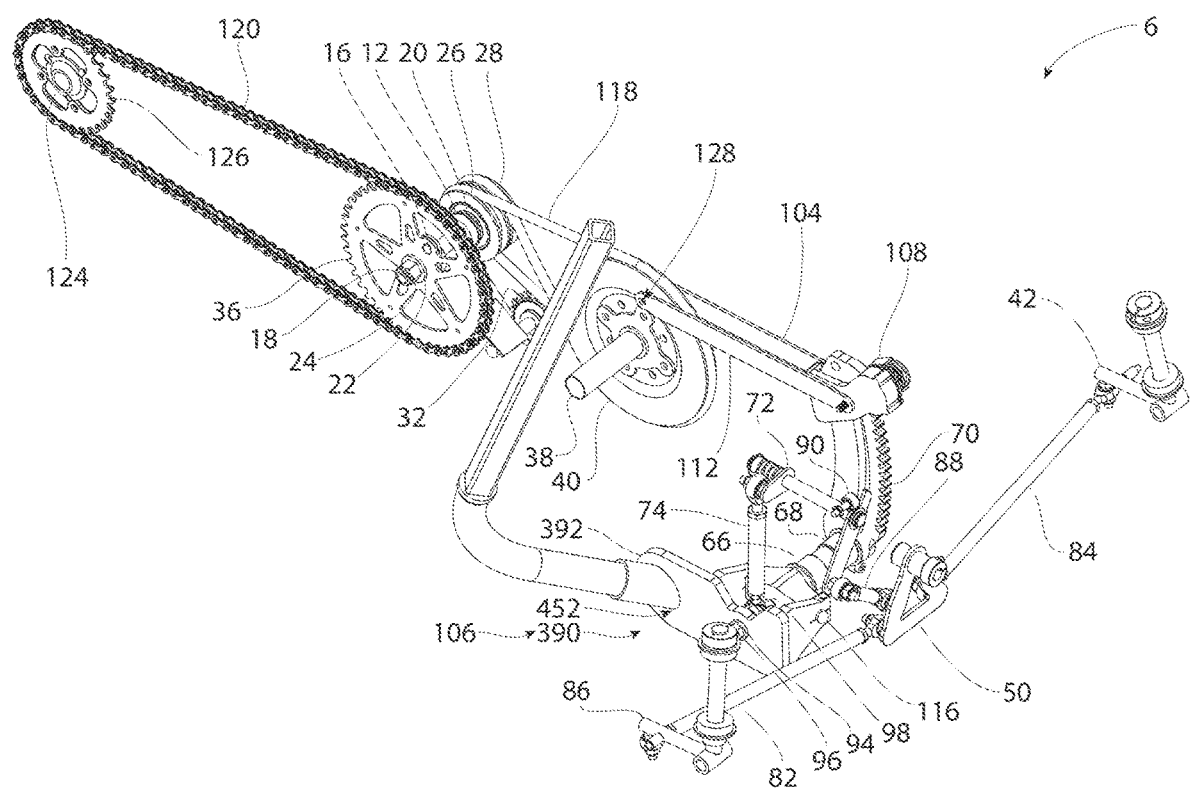
FIG. 5C is yet another oblique view of the transmission and steering group of FIG. 3E from another different direction, according to an embodiment of the invention.

The 8 mm key 30 may couple the clutch assemblies 26, 28 and the keyed shaft 234 of the drive shaft assembly 18 together. When these parts are operatively assembled as shown in FIGS. 5A-B, the clutch assemblies 26, 28 transmit torque to the drive shaft assembly 18 when the pulley 240 for round belt rotates in a counterclockwise direction.

The drive mount assembly 38 may include a tube 252, a ring adapter 254, and/or a drive plate 256. The drive mount assembly 38 is received in the boss 176 of the frame assembly 8.

The left spindle group 42 may include a left spindle assembly 260, a bearing 274, a bearing 276 identical to bearing 274, a clamp collar 278, and/or a locknut 280.

The left spindle assembly 260 may include an axle boss 262, a spindle 264, an arm 266, a brake stop 268, a spacer 270, and/or a bolt 272. The spindle 264 of the left spindle assembly 260 of the left spindle group 42 is received in the boss kingpin 170.

The right spindle group 86 may include a right spindle assembly 258, the bearing 274, the bearing 276, the clamp collar 278, and/or the locknut 280. The right spindle group 86 may be a mirror image of the left spindle group 42.

The right spindle assembly 258 may include the axle boss 262, the spindle 264, the arm 266, the brake stop 268, the spacer 270, and/or the bolt 272. The spindle 264 of the right spindle assembly 258 of the right spindle group 86 is received in the boss kingpin 168.

The steering group 50 may include a crank assembly 282, a bearing 294, a bearing 296 identical to bearing 294, a locknut 298 identical to locknut 280, a locknut 300 identical to locknut 280, and/or a locknut 302 identical to locknut 280.

The crank assembly 282 may include a steering triangle 284, a steering boss 286, a bolt 288 identical to bolt 272, a bolt 290 identical to bolt 272, and/or a bolt 292 identical to bolt 272. When operatively assembled as shown in FIGS. 5A through 5D, all component parts of the crank assembly 282 may be rigidly fixed together, for example, by welding. The steering boss 286 of the crank assembly 282 of the steering group 50 receives the shaft 182 of the frame assembly 8.

The lever arm group 70 may include a crank 312, a lever arm 314, a clamp bolt 316, and/or a lock nut 318. The lever arm group 70 is mounted to the tube 190 of the down tube assembly 184 of the frame assembly 8.

The crank group 72 may include a crank assembly 320, a plastic bearing 332, a plastic bearing 334 identical to plastic bearing 332, a locknut 336 identical to locknut 280, a locknut 338 identical to locknut 280, and/or a plastic spring 340.

The crank assembly 320 may include a bell crank 322, a shaft 324 identical to shaft 182, a bell crank 326, a bolt 328 identical to bolt 272, and/or a bolt 330 identical to bolt 272. When operatively assembled as shown in FIGS. 5A through 5D, all component parts of the crank assembly 320 may be rigidly fixed together, for example, by welding. The shaft 324 is mounted in holes in the plate 198 and plate 194 of the frame assembly 8.

The rod group 74 may include a rod eye 342, a rod eye 346, a rod 350, a jam nut 352, and/or a jam nut 354.

The tie rod group 82 may include a rod 356, a rod eye 358, a rod eye 362 identical to rod eye 358, a jam nut 366, and/or a jam nut 368 identical to jam nut 366.

The tie rod group 88 may include a rod eye 370 identical to rod eye 358, a rod eye 374 identical to rod eye 358, a rod 378, a jam nut 380 identical to jam nut 366, and/or a jam nut 382 identical to jam nut 366.

The stop assembly 90 may include a stop bolt 384, a jam nut 386, and/or a rubber stop 388. One flat end of the stop 388 may include a socket complementary to the head of the bolt 384. The stop bolt 384 may extend through the threaded boss 200 of the plate assembly 196 of the frame assembly 8.

The base assembly 106 may include a tube assembly 208 and/or a mount assembly 390.

The tube assembly 208 may include an elbow 210, an adapter 212, a square tube 214, and/or a round tube 216. The parts may be rigidly fixed together.

The mount assembly 390 may include a mounting plate 392, an ear 394, and/or an ear 396 identical to ear 394.

Figure 6:
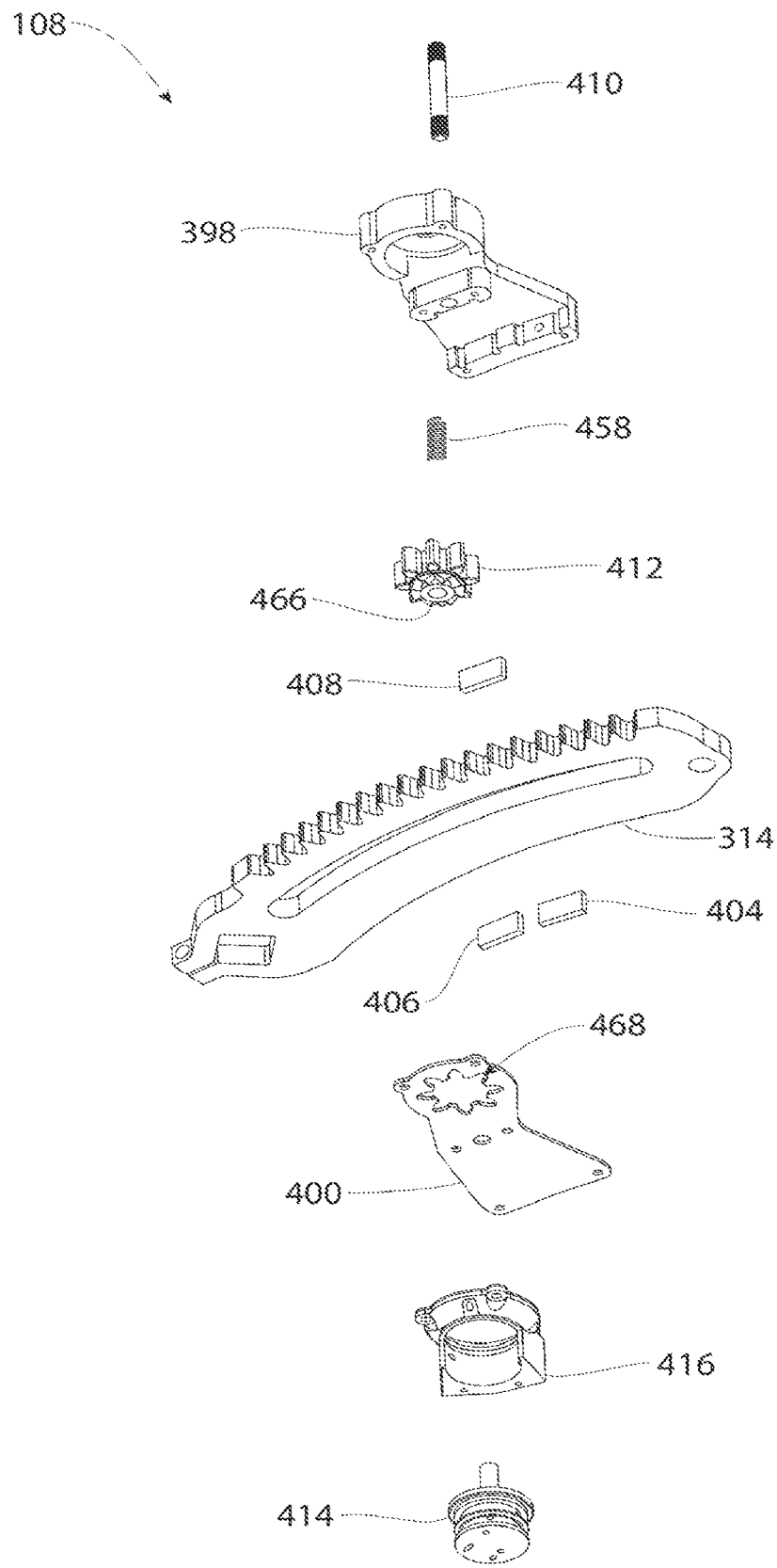
FIG. 6 is an exploded oblique view of a shift group of the transmission and steering group of FIG. 5A, according to an embodiment of the invention.
Figure 7:
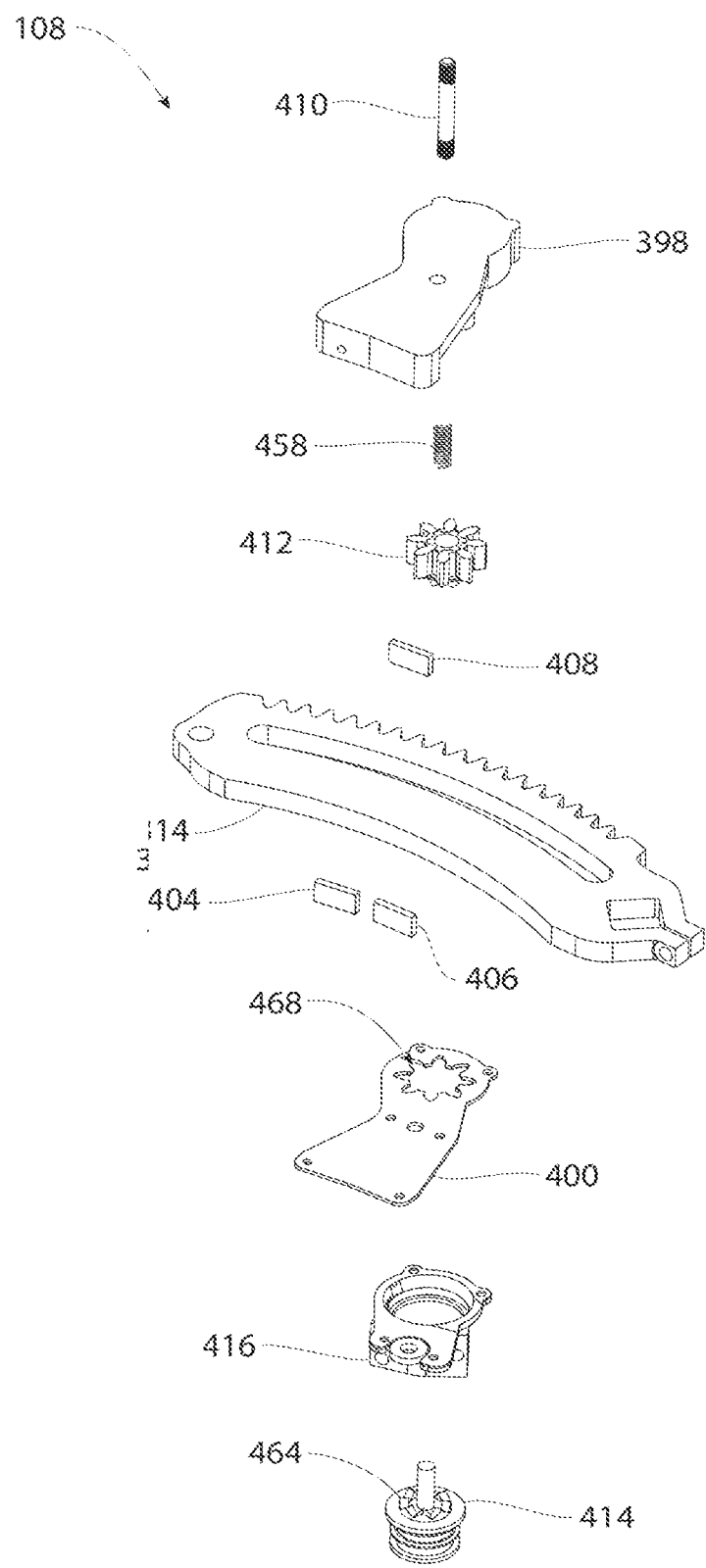
FIG. 7 is another exploded oblique view of the shift group of the transmission and steering group of FIG. 5A from a different direction, according to an embodiment of the invention.
Figure 8:
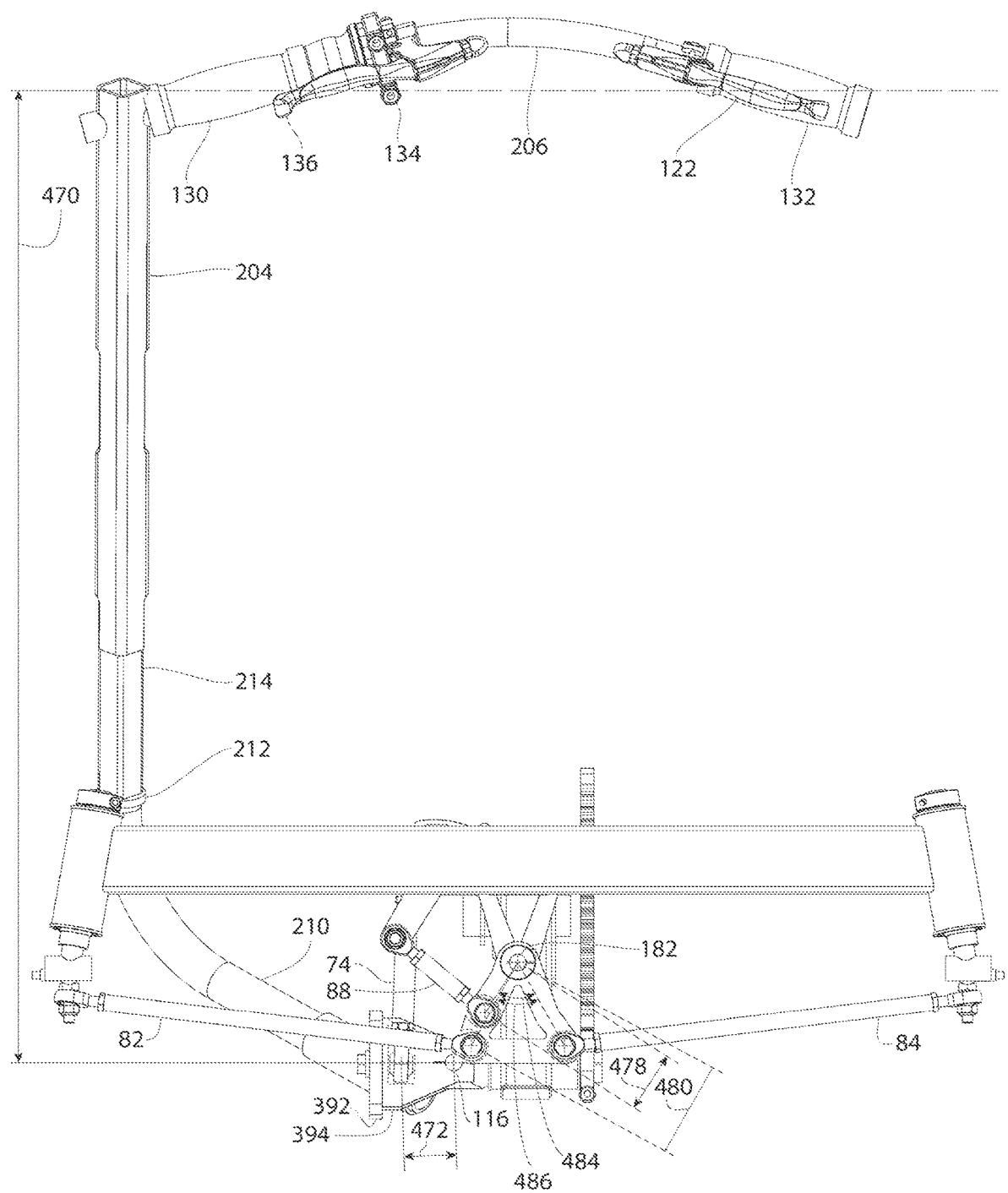
FIG. 8 is a front view of a frame, a handle assembly, a base assembly, and a steering system of the tricycle of FIG. 1, according to an embodiment of the invention.
Figure 9:
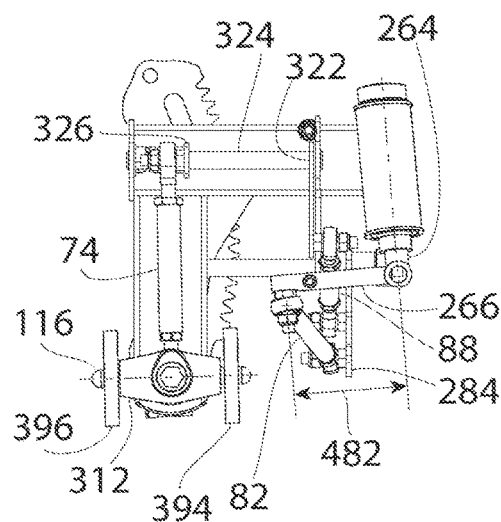
FIG. 9 is a side view of a portion of the steering system of FIG. 8, according to an embodiment of the invention.
Figure 10:
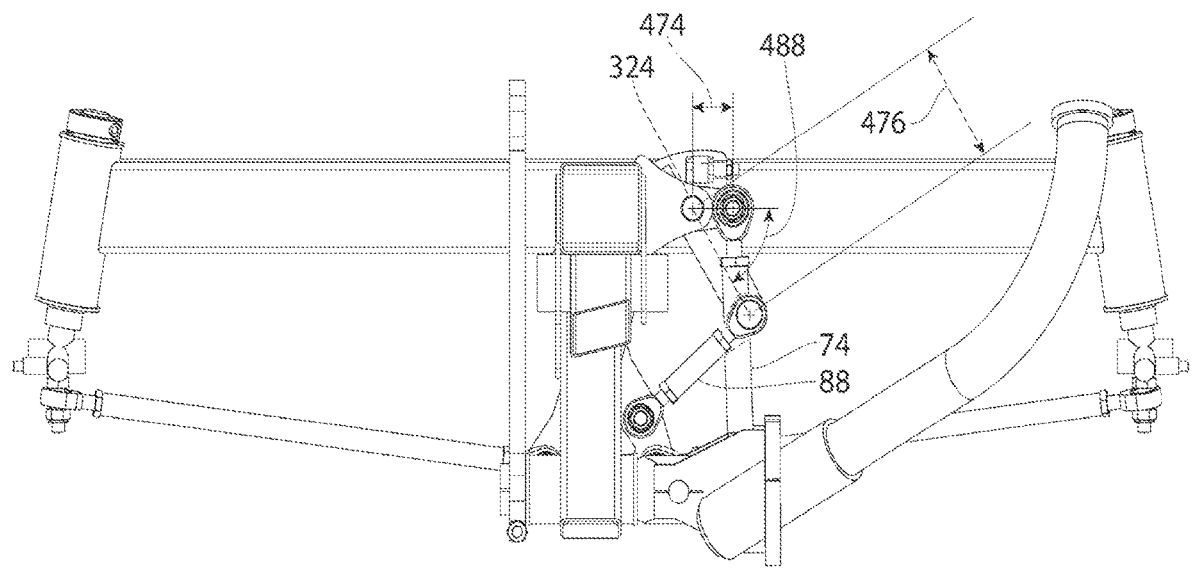
FIG. 10 is a rear view of the frame, handle assembly, base assembly, and steering system of FIG. 8, with portions of the frame omitted for clarity, according to an embodiment of the invention.

Referring to FIGS. 6 through 7, the shift group 108 may include a housing 398, a lock plate 400, a wear pad 404, a wear pad 406 identical to wear pad 404, a wear pad 408 identical to wear pad 404, a stud 410, a gear dog 412, a spool dog 414, and/or a shift cover 416. The lever arm 314 may be thought of as belonging to the shift group 108 or the lever arm group 70.

The round belt 118 may be replaced by a chain, flat belt or other type of belt, or other known equivalents.

The tricycle 2 is propelled by the rider's arms pushing and pulling on the handlebar 206 of the handle assembly 102 front or back along a direction substantially parallel to tube 156 of the frame assembly 8. The rider's push and pull input forces are transferred from the handle assembly 102 to the tube assembly 208 of the base assembly 106. The top tube 204 of the handle assembly 102 and the square tube 214 of the tube assembly 208 may have a telescopic interconnection so that the height of the handlebar 206 may be adjusted to suit the rider, preferably to be even with the rider's shoulders for ergonomic efficiency.

The bottom end of the round tube 216 of the tube assembly 208 is rigidly fixed in a hole 452 of the mounting plate 392 of the mount assembly 390 of the base assembly 106, for example, by welding. See FIGS. 2, 3A through 3E and 4A through 4E, and 5A through 5C. The mount assembly 390 is coupled to the crank 312 of the lever arm group 70 by the pin 116. The mount assembly 390 is free to pivot about a central longitudinal axis of the pin 116, however, the rider's push and pull input forces are transferred to the crank 312, causing the lever arm group 70 to rotate clockwise and counterclockwise (as viewed in FIG. 5B, for example). The front ends of the links 104, 112 are coupled to the lever arm 314 of the lever arm group 70 by the shift group 108. The lever arm group 70 oscillation causes the links 104, 112 to reciprocate front and back. The back ends of the links 104, 112 are coupled to the drive pulley 40 by the drive stub 128. The links 104, 112 reciprocation causes the drive pulley 40 to oscillate with the lever arm group 70. The round belt 118 loops around, and oscillates with, the drive pulley 40.

The round belt 118 loops around each clutch assembly 26, 28 and causes each pulley 240 for round belt to oscillate.

Referring to FIGS. 5A through 5B, when the drive pulley 40 rotates counterclockwise, the clutch assembly 26 rotates counterclockwise and the clutch assembly 28 rotates clockwise. The clutch assembly 26 transmits torque to the drive shaft assembly 18. The clutch assembly 28 does not transmit torque.

When the drive pulley 40 rotates clockwise, the clutch assembly 26 rotates clockwise and the clutch assembly 28 rotates counterclockwise. The clutch assembly 26 does not transmit torque. The clutch assembly 28 transmits torque to the drive shaft assembly 18.

Thus, on the rider's push stroke, the clutch assembly 26 transmits torque to the drive shaft assembly 18 to turn it counterclockwise, and on the rider's pull stroke, the clutch assembly 28 transmits torque to the drive shaft assembly 18 to turn it counterclockwise.

The drive shaft assembly 18 rotation is transferred to the sprocket crank assembly 16, the front sprocket 36, the rear chain assembly 120, the rear sprocket 126, the rear sprocket adapter 124, and the rear wheel assembly 10. For this reason, the rear wheel assembly 10 may be referred to as a drive wheel or a drive road wheel.

Figure 5D:
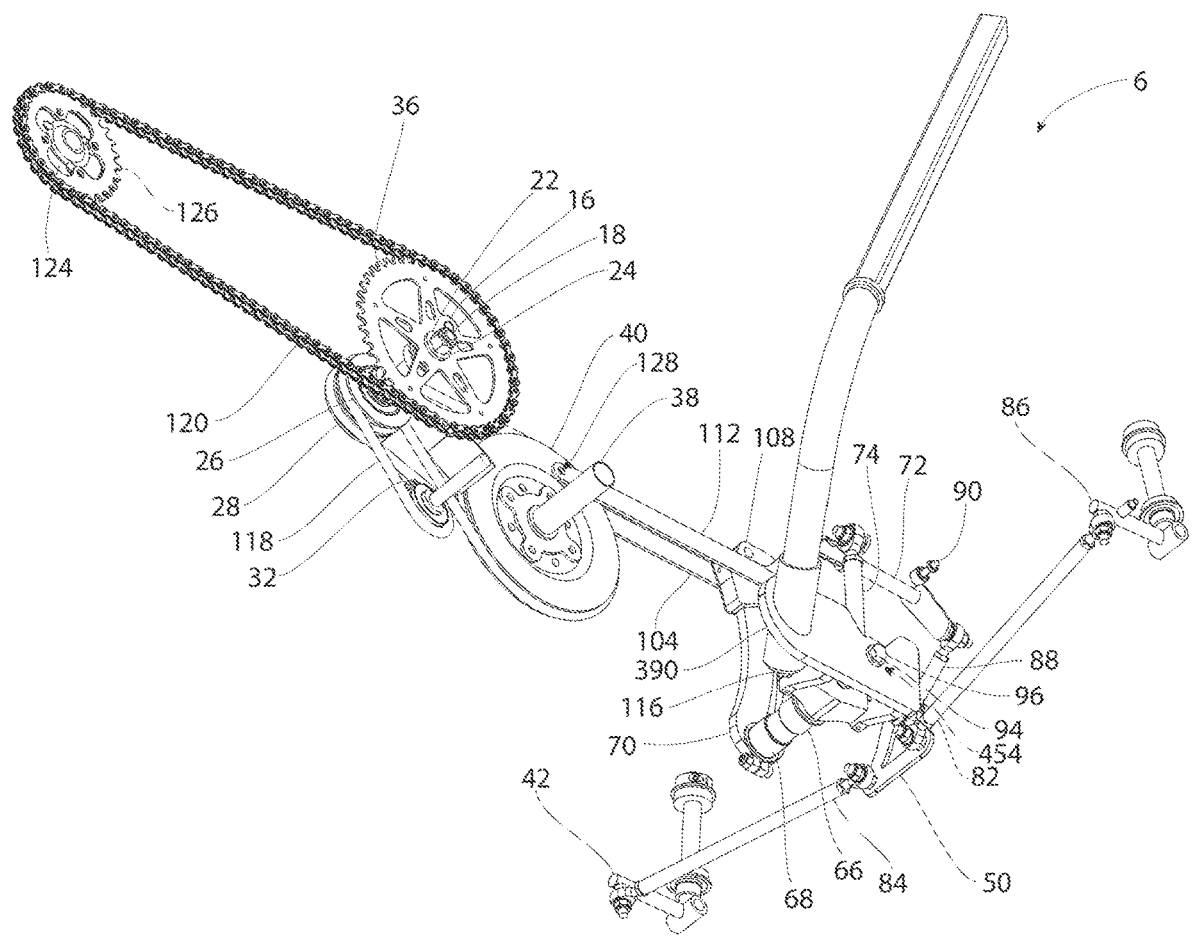
FIG. 5D is yet another oblique view of the transmission and steering group of FIG. 3E from yet another different direction, according to an embodiment of the invention.

The round belt 118 loops around the idle sprocket 32, which may be adjustably mounted to the frame assembly 8 so that tension in the round belt 118 may be adjusted. Referring to FIGS. 2, 5B, and 5D, the idle sprocket 32 is mounted on an idle sprocket shaft 460, which is in turn mounted on an idle sprocket bracket 462; the idle sprocket bracket 462 is adjustably connected to the bottom end of the tube idler mount 174 of the frame assembly 8. The idle sprocket 32 may be mounted at an angle relative to the clutch assemblies 26, 28 for smooth operation with the round belt 118 (which is inherently angled in its course from clutch assembly 26 to clutch assembly 28 because they are side-by-side). The drive pulley 40 may also be angled for the same reasons.

The propulsion system with clutch assemblies 26, 28 as illustrated inherently resists or prevents the tricycle 2 from unintentionally rolling in reverse. Referring to FIGS. 5A through 5B, when the tricycle 2 attempts to roll backwards, the drive shaft assembly 18 attempts to rotate clockwise. Due to the routing of the round belt 118, if either clutch assembly 26 or 28 attempts to rotate clockwise with the drive shaft assembly 18, the round belt 118 will cause the other clutch assembly to attempt to rotate counterclockwise to arrest the roll back. This may be advantageous. When ascending a hill, the rider can rest if necessary, without risking rolling backwards downhill. Shifting, described below, can take place without risking a backwards roll. However, a release mechanism is contemplated to interrupt the anti-roll-back function so that the tricycle 2 can be rolled backwards on purpose, for example, for parking, loading/unloading, storage, and the like.

The clutch assemblies 26, 28 are quieter than conventional freewheel apparatus, they begin to transmit torque faster (versus approximately 6 degrees to 8 degrees of rotation before torque transmission), they are more compact, narrower, and lighter weight.

The tricycle 2 is steered by the rider's arms pushing the handlebar 206 of the handle assembly 102 right or left along a direction substantially perpendicular to tube 156 of the frame assembly 8. Steering functions the same way, whether the propulsion system is in its fully forward position, its fully backward position, or an intermediate position. The rider's steering input forces are transferred from the handle assembly 102 to the tube assembly 208 and the mount assembly 390.

The mount assembly 390 is free to pivot about the central longitudinal axis of the pin 116. The bottom end of the rod group 74 is coupled to a hole 454 of the mounting plate 392 of the mount assembly 390 of the base assembly 106 by the bolt 96, washers 92, 94, and lock nut 98. Thus, the rider's right or left steering input forces cause the mount assembly 390 to pivot about the pin 116, which causes the rod group 74 to move up and down along an arcuate path.

The top end of the rod group 74 is coupled to the bolt 330 of the bell crank 326 at the back end of the crank assembly 320 of the crank group 72 by the locknut 338. The front and back ends of the shaft 324 of the crank assembly 320 are supported in holes in plate 198 and plate 194, respectively, so that the crank assembly 320 is free to pivot about a central longitudinal axis of the shaft 324. The up and down movement of the rod group 74 causes the crank assembly 320 to oscillate about the central longitudinal axis of the shaft 324. The bolt 328 of the bell crank 322 at the front end of the crank assembly 320 is coupled to the top end of the tie rod group 88 by the locknut 336. The bottom end of the tie rod group 88 is coupled to the bolt 292 of the crank assembly 282 of the steering group 50 by the ball 310 for 8 mm rod eye and locknut 298. The steering boss 286 of the crank assembly 282 is mounted on the shaft 182 of the frame assembly 8, so that the steering group 50 is free to pivot about a central longitudinal axis of the shaft 182. Thus the oscillation of the crank assembly 320 is transferred by the tie rod group 88 to cause oscillation of the steering group 50, which is then transferred by the tie rod groups 82, 84 to the right spindle group 86 and left spindle group 42, respectively, to turn the right wheel assembly 44 and left wheel assembly 46. For this reason, the right and left wheel assemblies may be referred to as steering wheels or steering road wheels (to differentiate from a steering ring gripped by a rider or driver and commonly referred to as a "steering wheel").

By way of example, an embodiment of the tricycle 2 may have the following dimensions in order to provide a 10-foot turning circle (5-foot turning radius) in response to a rider steering input that moves the handlebar 1 foot right or 1 foot left of center (neutral), while maintaining satisfactory front wheel alignment to prevent tire rubbing or scrubbing:

The distance 470 between the rider's hand position on the handlebar 206 and the central longitudinal axis of the pin 116 may be adjustable, for example between 660.4 mm (26") and 863.6 mm (34");

The distance 472 between the central longitudinal axis of the pin 116 and the center of the ball at the bottom end of the rod group 74 may be 39.24 mm (1.54");

The distance between centers of the balls at each end of the rod group 74 may be 155.5 mm (6.12"), in other words, the functional length of the rod group 74;

The distance 474 between the center of the ball at the top end of the rod group 74 and the central longitudinal axis of the shaft 324 may be 25 mm (0.984");

The distance 476 between the central longitudinal axis of the shaft 324 and the ball at the top end of the tie rod group 88 may be 68.5 mm (2.70");

The distance between centers of the balls at each end of the tie rod group 88 may be 88.8 mm (3.50"), in other words, the functional length of the rod group 88;

The distance 478 between the center of the ball at the bottom end of the tie rod group 88 and the central longitudinal axis of the shaft 182 may be 46.3 mm (1.82");

The distance 480 between the central longitudinal axis of the shaft 182 and the center of the ball at the medial end of the tie rod group 82 may be 73.8 mm (2.9"), and the same for tie rod group 84;

The distance between centers of the balls at each end of the tie rod groups 82, 84 may be 307.5 mm (12.1"), in other words, the functional length of each rod group 82, 84;

The distance 482 between the center of the ball at the lateral end of the tie rod group 82 and the central longitudinal axis of the spindle 264 may be 78.78 mm (3.101");

The angle 484 between a first line drawn between the center of the ball at the bottom end of the tie rod group 88 and the central longitudinal axis of the shaft 182 and a second line drawn between the central longitudinal axis of the shaft 182 and the center of the ball at the medial end of the tie rod group 84 may be 61';

The angle 486 between a first line drawn between the central longitudinal axis of the shaft 182 and the center of the ball at the medial end of the tie rod group 82 and a second line drawn between the central longitudinal axis of the shaft 182 and the center of the ball at the medial end of the tie rod group 84 may be 56.5 degrees; and The angle 488 between a first line drawn between the center of the ball at the top end of the rod group 74 and the central longitudinal axis of the shaft 324 and a second line drawn between the central longitudinal axis of the shaft 324 and the ball at the top end of the tie rod group 88 may be 59 degrees.

Shifting is initiated by the rider via the twist grip group 134 or shift control. It may be advantageous for the rider to shift while the handlebar is in the full forward position and the tricycle 2 is coasting or stopped so that there is no propulsion load on the shifting system. This ties in with the anti-roll-back function of the propulsion system discussed above.

A ring of the twist grip group 134 may rotate clockwise and counterclockwise and may include indicia for low, high, and intermediate settings or "gears." Preferably, there are the same number of indicia or settings as there are teeth on the lever arm 314. The illustrated lever arm 314 has 18 teeth. Turning the ring in one direction shifts to a lower setting or gear that requires less rider effort for propulsion and delivers less speed, and turning the ring in the opposite direction shifts to a higher setting or gear that requires more rider effort for propulsion and delivers more speed. Shift cables (not shown) lead from the twist grip group 134 to the shift group 108. The cables transfer rotation from the ring of the twist grip group 134 to the spool dog 414 of the shift group 108.

When the shift group 108 is in a particular setting or gear, complementary annular arrays of angled teeth 464, 466 on facing sides of the spool dog 414 and gear dog 412, respectively, are maximally meshed together, engaged, or interdigitated. A spring 458 pushes the gear dog 412 toward the spool dog 414 so that the teeth 464, 466 engage. At the same time, the gear dog 412 also engages within a star-shaped hole 468 through the lock plate 400, which prevents the gear dog 412 from rotating.

In response to rider shifting input, the spool dog 414 rotates. However, the gear dog 412 is initially unable to rotate due to engagement of its non-circular exterior profile within the hole 468 of the lock plate 400. Instead, the angled teeth 466 of the gear dog 412 ride up the angled teeth 464 of the spool dog 414, pushing the gear dog 412 away from the spool dog 414 until the gear dog 412 moves out of the hole 468 of the lock plate 400. When the gear dog 412 is out of the hole 468, the gear dog 412 is free to rotate. The teeth 464, 466 remain partially meshed together or engaged so that rotation of the spool dog 414 causes the gear dog 412 to rotate. The gear dog 412 rotates to the next setting or gear along the lever arm 314, at which point the spring 458 pushes the gear dog 412 back into the hole 468 of the lock plate 400 and against the spool dog 414.

Exemplary embodiments of the technology will be best understood by reference to the drawings, wherein like parts are designated by like numerals throughout. It will be readily understood that the components of the technology, as generally described and illustrated in the figures herein, could be arranged and designed in a wide variety of different configurations. Thus, the following more detailed description of the embodiments of the apparatus, system, and method is not intended to limit the scope of the invention, as claimed, but is merely representative of exemplary embodiments of the technology.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The terminology used in this application is to be interpreted according to ordinary and customary usage in the field of cycles (unicycles, bicycles, tricycles, etc.) as exemplified in International Patent Classification Code B62 and equivalent codes in other patent classification systems.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Also notably, the terms "approximately" or "approximate" are employed herein throughout, including this detailed description and the attached claims, with the understanding that the terms denote a level of exactitude commensurate with the skill and precision common within the particular field of endeavor, as applicable.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the technology. While specific embodiments and applications of the present technology have been illustrated and described, it is to be understood that the technology is not limited to the precise configuration and components disclosed herein. Various modifications, changes, and variations which will be apparent to those skilled in the art may be made in the arrangement, operation, and details of the methods and systems of the present technology disclosed herein without departing from the spirit and scope of the technology. Therefore, the invention is not to be limited except by the following claims, as appropriately interpreted in accordance with the doctrine of equivalents.

The invention claimed is:

1. A vehicle powered by a rider's arm, comprising:
   a propulsion mechanism actuated by the rider's arm engaging a handlebar;
   the vehicle having a front and a rear, a base assembly, a frame assembly, a tube assembly, and a handle assembly;
   the handle assembly including the handlebar, and the handle assembly connected to and positioned substantially parallel to the tube assembly of the vehicle;
   a push input force from the rider's arm and a pull input force from the rider's arm transfers from the handle assembly to the tube assembly;
   the base assembly including a mount assembly, with the tube assembly rigidly fixed to the mount assembly of the base assembly;
   a drive shaft assembly extended from the frame assembly, with the drive shaft assembly including a drive shaft;
   a lever arm group attached to the frame assembly, with the lever arm group including a lever crank;
   the mount assembly coupled to the lever crank of the lever arm group by a pin, the pin extends from the lever crank, and the mount assembly free to pivot about a central longitudinal axis of the pin;
   a push of the rider's arm on the handle assembly generates a forward oscillating motion in a forward direction toward the front of the vehicle with a push input force transferred to the lever crank, and a pull of the rider's arm on the handle assembly generates a rearward oscillating motion in a rearward direction toward the rear of the vehicle with a pull input force transferred to the lever crank;
   the push input force rotates the lever arm group in the forward direction, and the pull input force rotates the lever arm group in the rearward direction;
   a lever link having a front link end and a back link end, and the front link end is coupled to the lever arm of the lever arm group;
   the forward oscillating motion of the lever arm group causes the lever link to reciprocate toward the front of the vehicle, and the rearward oscillating motion of the lever arm group causes the lever links to reciprocate toward the rear of the vehicle;
   the back link end of the lever link is coupled to a drive pulley at a drive stub;
   a clutch belt loops around the drive pulley, the clutch belt loops a first clutch pulley of a first clutch assembly, and the clutch belt loops around a second clutch pulley of a second clutch assembly;
   the reciprocation of the lever link by the lever arm group causes the drive pulley to rotationally oscillate, and the drive pulley oscillates the clutch belt in a rotational movement, to rotationally oscillate the first clutch pulley and to rotationally oscillate the second clutch pulley;
   as the drive pulley rotates, the first clutch pulley of the first clutch assembly rotates in a first clutch rotational direction and the second clutch pulley of the second clutch assembly rotates in a second clutch rotational direction, with the first clutch rotational direction of the first clutch assembly opposite to the second clutch rotational direction of the second clutch assembly;
   as the drive pulley rotates in a drive pulley first rotational direction, the first clutch assembly transmits a drive torque to a drive shaft of a drive shaft assembly, and the second clutch assembly does not transmit the drive torque to the drive shaft when the drive pulley rotates in the first rotational direction;
   as the drive pulley rotates in a drive pulley second rotational direction, the second clutch assembly transmits the drive torque to the drive shaft of the drive shaft assembly, and the first clutch assembly does not transmit the drive torque to the drive shaft when the drive pulley rotates in the second rotational direction;
   the drive torque upon the drive shaft of the drive shaft assembly rotates a sprocket crank assembly, the sprocket crank assembly having a front sprocket and a rear sprocket, with a rear chain wrapped around the front sprocket and the rear sprocket; and
   a rear sprocket adapter connects to a drive wheel of the vehicle, and the drive wheel rotates to propel the vehicle along a road surface.

2. The vehicle of claim 1, additionally wherein:
   the handle assembly and the tube assembly have a telescopic interconnection, and a height of the handlebar adjustable to suit a rider of the vehicle.

3. The vehicle of claim 1, additionally wherein:
   an idle sprocket mounts at an angle relative to the first clutch assembly and the second clutch assembly for smooth operation with the clutch belt.

4. The vehicle of claim 3, additionally wherein:
   the clutch belt loops around the idle sprocket, the idle sprocket adjustably mounted to the frame assembly to adjust tension in the clutch belt, with the idle sprocket mounted on an idle sprocket shaft, the idle sprocket shaft mounted on an idle sprocket bracket, the frame assembly including a tube idler mount, and the idle sprocket bracket adjustably connected to a bottom end of the tube idler mount of the frame assembly.

5. The vehicle of claim 1, additionally comprising:
   the handlebar of the handle assembly actuated by the rider's arm with a right steering input force in a right steer direction and actuated by the rider's arm with a left steering input force in a left steer direction, with the right steer direction and the left steer direction substantially perpendicular to the tube of the frame assembly;
   the right steering input force and the left steering input force transferred from the handle assembly to the tube assembly, and transferred from the tube assembly to the mount assembly;

a tie rod group is coupled to the mount assembly and the tie rod group includes a rod top end and a rod bottom end and the tie rod group moves upward and downward along an arcuate rod path;

the right steering input force from the rider's arm causes the mount assembly to make an upward pivot about the pin, and a left steering input force from the rider's arm causes the mount assembly to make a downward pivot about the pin;

a bell crank is coupled to a bell crank assembly, and the rod top end of the rod group is coupled to the bell crank of the bell crank assembly;

the bell crank assembly is free to pivot about a central longitudinal axis of a bell crank shaft, the bell crank shaft having a front crank shaft end and a back crank shaft end, with the front crank shaft end supported within a front plate of the frame assembly, and the back crank shaft end supported within a back plate of the frame assembly;

an upward movement of the rod group causes the bell crank assembly to oscillate in a first steering direction about the central longitudinal axis of the bell crank shaft, and a downward movement of the rod group causes the bell crank assembly to oscillate in a second steering direction about the central longitudinal axis of the bell crank shaft;

the bell crank assembly has a crank bolt, and the crank bolt is coupled to the top end of the tie rod group at a front end of the bell crank assembly, and the bottom end of the tie rod group is coupled to a steering crank bolt of a steering crank assembly by a steer ball;

a steering boss of the bell crank assembly is mounted on the bell crank shaft of the frame assembly, and with a steering group that includes the steering crank assembly free to pivot about a central longitudinal axis of the bell crank shaft; and a right steer wheel assembly turned and a left steer wheel assembly turned by a crank oscillation of the bell crank assembly in the first steering direction about the central longitudinal axis of the bell crank shaft and in a second steering direction about the central longitudinal axis of the bell crank shaft, the oscillation of the bell crank assembly transferred by the tie rod group to cause oscillation of the steering group, the oscillation of the steering group transferred by a right tie rod group to a right spindle group of a right steer wheel assembly, and the oscillation of the steering group transferred to by a left tie rod group to a left spindle group of a left steer wheel assembly.

6. The vehicle of claim 5, wherein the clutch belt is a clutch chain.

7. The vehicle of claim 1, wherein the vehicle is a tricycle.

8. The vehicle of claim 1, wherein the clutch belt is a clutch chain.

9. A vehicle powered by a push input force and a pull input force on a handlebar, the vehicle comprising:

a propulsion mechanism actuated by the push input force and the pull input force on a handlebar, and the propulsion mechanism transmits torque to a drive wheel of the vehicle with the push input force and the pull input force on the handlebar;

the vehicle having a vehicle front and a vehicle rear, a base assembly, and a handle assembly;

the handle assembly includes the handlebar, and the handle assembly positioned substantially parallel to a tube assembly of the vehicle;

the push input force transfers from the handle assembly to the tube assembly, and the pull input force transfers from the handle assembly to the tube assembly;

the tube assembly has a bottom end, and the bottom end of the tube assembly is rigidly fixed to the base assembly;

the base assembly including a mount assembly, the tube assembly rigidly affixed to the mount assembly, and the mount assembly coupled to the crank of a lever arm group by a pin, the pin extends from the crank, and the mount assembly free to pivot about a central longitudinal axis of the pin;

the push input force on the handle assembly generates a forward oscillating motion in a forward direction toward a front of the vehicle with an input force transferred to the crank, and the pull input force on the handle assembly generates a rearward oscillating motion in a rearward direction toward a rear of the vehicle with an input force transferred to the crank;

the push input force rotates the lever arm group in the forward direction, and the pull input force rotates the lever arm group in the rearward direction;

the lever arm group includes a lever link, the lever link having a link front end and a link back end, with the link front end of the lever link coupled to the lever arm;

the oscillating motion of the lever arm group causes the lever link to reciprocate toward the front of the vehicle and to reciprocate toward the rear of the vehicle;

the link back end of the lever link are coupled to a drive pulley at a drive stub;

a clutch belt loops around the drive pulley, the clutch belt loops a first clutch pulley of a first clutch assembly, and the clutch belt loops around a second clutch pulley of a second clutch assembly;

the reciprocation of the lever links by the lever arm group causes the drive pulley to rotationally oscillate, and the drive pulley oscillates the clutch belt in a rotational movement, to rotationally oscillate the first clutch pulley and to rotationally oscillate the second clutch pulley;

as the drive pulley rotates, the first clutch pulley of the first clutch assembly rotates in a first clutch rotational direction and the second clutch pulley of the second clutch assembly rotates in a second clutch rotational direction, with the first clutch rotational direction of the first clutch assembly opposite to the second clutch rotational direction of the second clutch assembly;

as the drive pulley rotates in a drive pulley first rotational direction, the first clutch assembly transmits a drive torque to a drive shaft of a drive shaft assembly, and the second clutch assembly does not transmit the drive torque to the drive shaft when the drive pulley rotates in the first rotational direction;

as the drive pulley rotates in a drive pulley second rotational direction, the second clutch assembly transmits the drive torque to the drive shaft of the drive shaft assembly, and the first clutch assembly does not transmit the drive torque to the drive shaft when the drive pulley rotates in the second rotational direction;

the drive torque upon the drive shaft of the drive shaft assembly rotates a sprocket crank assembly, the sprocket crank assembly having a front sprocket and a rear sprocket, with a rear chain wrapped around the front sprocket and the rear sprocket; and a rear sprocket adapter connects to a drive wheel of the vehicle, and the drive wheel rotates to propel the vehicle along a road surface.

10. The vehicle of claim 9, wherein the clutch belt is a clutch chain.

11. The vehicle of claim 9, additionally wherein:
the handle assembly and the tube assembly have a telescopic interconnection, and a height of the handlebar adjustable to suit a rider of the vehicle.

12. The vehicle of claim 9, additionally wherein:
an idle sprocket mounts at an angle relative to the first clutch assembly and the second clutch assembly for smooth operation with the clutch belt.

13. The vehicle of claim 12, wherein the clutch belt is a clutch chain.

14. The vehicle of claim 9, additionally wherein:
the clutch belt loops around the idle sprocket, the idle sprocket adjustably mounted to the frame assembly to adjust tension in the clutch belt, with the idle sprocket mounted on an idle sprocket shaft, the idle sprocket shaft mounted on an idle sprocket bracket, the frame assembly including a tube idler mount, and the idle sprocket bracket adjustably connected to a bottom end of the tube idler mount of the frame assembly.

15. The vehicle of claim 14, wherein the clutch belt is a clutch chain.

16. The vehicle of claim 9, wherein the vehicle is a tricycle.

17. The vehicle of claim 9, additionally comprising:
the handlebar of the handle assembly actuated a right steering input force in a right steer direction and actuated by a left steering input force in a left steer direction, with the right steer direction and the left steer direction substantially perpendicular to the tube of the frame assembly;
the right steering input force and the left steering input force transferred from the handle assembly to the tube assembly and from the tube assembly a mount assembly;
the mount assembly includes a pin having a central longitudinal pin axis, and the mount assembly pivots about the central longitudinal pin axis;
a bottom end of the rod group is coupled to a hole of the mounting plate of the mount assembly of the base assembly;
the right steering input force causes a mount assembly to make an upward pivot about the pin, and a left steering input force causes a mount assembly to make a downward pivot about the pin;
the rod group moves upward and downward along an arcuate rod path;
a top end of the rod group is coupled to a bell crank at the back end of a crank assembly of the crank group;
the crank assembly is free to pivot about a central longitudinal axis of the shaft crank assembly, with the front end of the shaft of the crank assembly supported in front hole in front plate, and the back end of the shaft of the crank assembly supported in a back hole in a back plate;
an upward movement of the rod group causes the crank assembly to oscillate in a first steering direction about the central longitudinal axis of the shaft, and a downward movement of the rod group causes the crank assembly to oscillate in a second steering direction about the central longitudinal axis of the shaft;
the bolt of the bell crank at the front end of the crank assembly is coupled to a top end of the tie rod group;
a bottom end of the tie rod group is coupled to a crank bolt of the crank assembly of the steering group by a steer ball,
a steering boss of the crank assembly mounted on the shaft of the frame assembly, with the steering group is free to pivot about a central longitudinal axis of the shaft; and
a right steer wheel assembly turned and a left steer wheel assembly turned by a crank oscillation of the crank assembly in the first steering direction about the central longitudinal axis of the shaft and in a second steering direction about the central longitudinal axis of the shaft, the oscillation of the crank assembly transferred by the tie rod group to cause oscillation of the steering group, the oscillation of the steering group transferred by a right tie rod group to a right spindle group of a right steer wheel assembly, and the oscillation of the steering group transferred to by a left tie rod group to a left spindle group of a left steer wheel assembly.

* * * * *